J. Madden.
Guard for Circular Saws.
№ 72652                Patented Dec. 24, 1867.
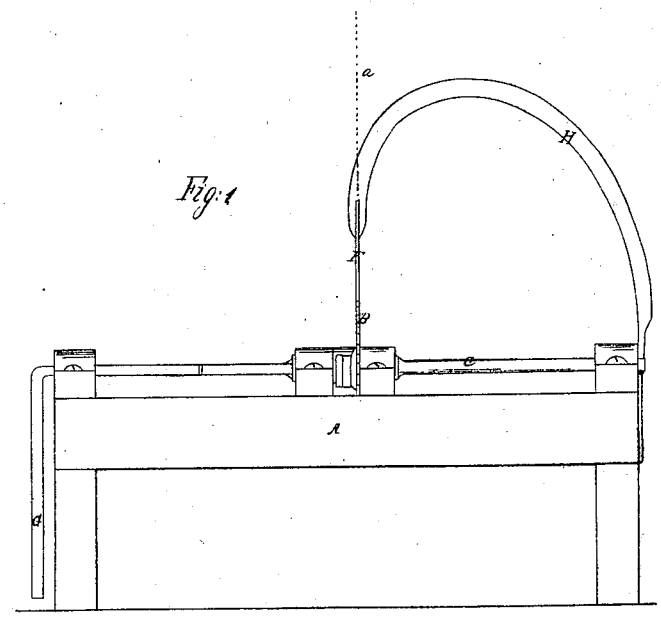
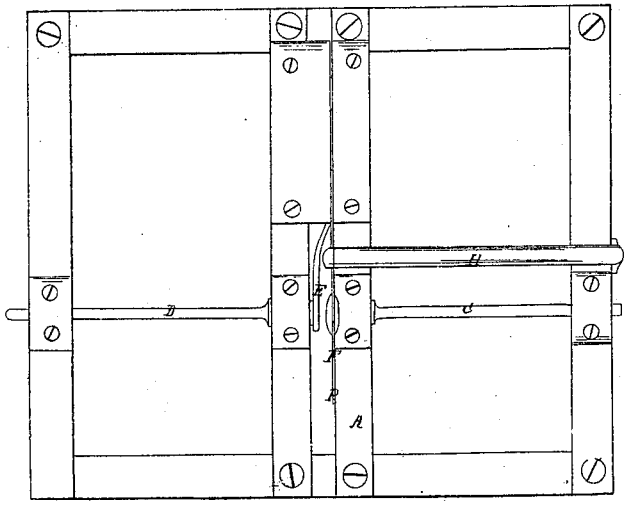
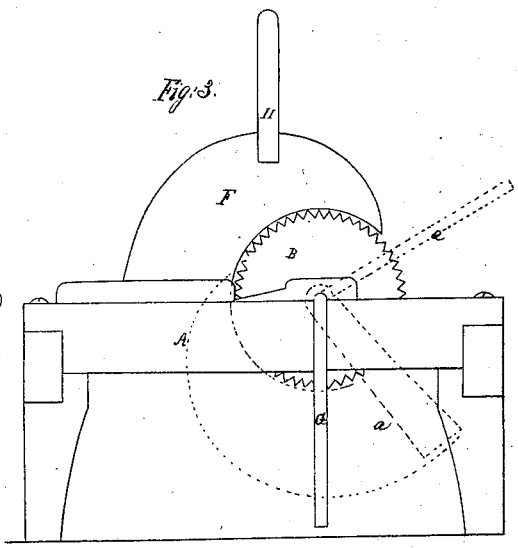
Witnesses                Inventor:
John Madden

United States Patent Office.

JOHN MADDEN, OF CLEVELAND, OHIO.

Letters Patent No. 72,652, dated December 24, 1867.

---

IMPROVEMENT IN GUARDS FOR CIRCULAR SAWS.

---

The Schedule referred to in these Letters Patent and making part of the same.

---

TO ALL WHOM IT MAY CONCERN:

Be it known that I, JOHN MADDEN, of Cleveland, in the county of Cuyahoga, and State of Ohio, have invented certain new and useful Improvements in Circular-Saw Guards; and I do hereby declare that the following is a full and complete description of the same, reference being had to the accompanying drawings, making a part of this specification, in which—

Figure 1 is a front view of the saw and guard.
Figure 2 is a top view.
Figure 3 is a side view.

Like letters of reference refer to like parts in the views.

In fig. 1, A is a frame or table in which is mounted the saw B on the shaft C, all of which is or may be constructed and arranged in the ordinary way. D is a shaft arranged across the table, and journalled in the same way as the shaft C, the relative position of which to the saw is shown in fig. 2. To the inner end of this shaft is keyed an arm, E, fig. 2, so curved as to bring its free end immediately in line with the edge of the saw, and to which is fixed a guard, F, fig. 3. This guard consists of a metallic plate of about the thickness of the saw, and the peculiar shape of which is such that its inner end describes a circle correlatively to that of the saw and surrounds it in close proximity, as shown in fig. 3, in which it will be seen that all of the saw above the table is covered by the guard, with the exception of a short distance of the front edge above the table, which is left uncovered for the purpose of feeding the board or lumber to the saw.

In consequence of the guard being attached to the shaft D, and which shaft is in line with the centre of the saw, it will be obvious that as the shaft is turned the guard will still retain its relative position to the saw; and should it be so far turned as to bring it under the saw and table, as indicated by the dotted lines $a$, fig. 3, and thus uncover the whole of the saw above the table, it will still retain its same relative distance from it. Hence the saw and guard, having one common centre, the latter can be moved to any distance around or over the saw by the crank G that may be required to accommodate the thickness of the lumber to be sawn. Thus, for an inch board all the saw above the table can be covered, with the exception of an inch or so in front, for the passage of the board; and so, for thicker lumber, the guard can be thrown back more or less, as the thickness of the board may require.

It is well known to those using these table-saws that strips and blocks sawn off are often thrown back with considerable violence by being caught upon the teeth of the saw. More especially is this the case with large saws, or those having long, coarse teeth. In order to prevent this, and avoid the danger consequent of the stuff flying back, the guard, as above described, is provided, which effectually prevents the strips and blocks from getting across the saw; therefore cannot be caught up by it and thrown back, but will slide along, back or sidewise, out of the way, thereby removing all possible danger. Also, saws being thus covered, the workmen or others engaged about them are not liable to get their hands cut, as is frequently done with saws not thus guarded. It not unfrequently happens that saws get injured by boards or other like stuff falling upon them, but when protected as above described, the guard receives the blow, and thus the saw escapes injury. In order to prevent the guard from any lateral displacement it is supported by a brace, H, fixed to one side of the frame and projected over to the saw, as shown in the drawing, in which it will be seen that in the end of the brace is a deep slot for receiving the edge of the guard, and by which it is held for the purpose aforesaid. The brace may be pendent, and attached to a frame, or secured above the saw, as noted by the dotted line $a'$, which may be best in some cases.

What I claim as my improvement, and desire to secure by Letters Patent, is—

The herein-described adjustable circular guard F, so arranged in relation to the saw B that the said guard and saw shall turn on one common centre and in the same plane, so that the said guard will cover or expose more or less of the saw-teeth upon one side only of the saw, substantially as and for the purpose specified.

JOHN MADDEN.

Witnesses:
J. H. BURRIDGE,
J. HOLMES.